No. 806,759. PATENTED DEC. 5, 1905.
H. TUTTLE.
FLUID POWER TRANSMITTER.
APPLICATION FILED JUNE 13, 1903.
4 SHEETS—SHEET 1.
Fig. 1.
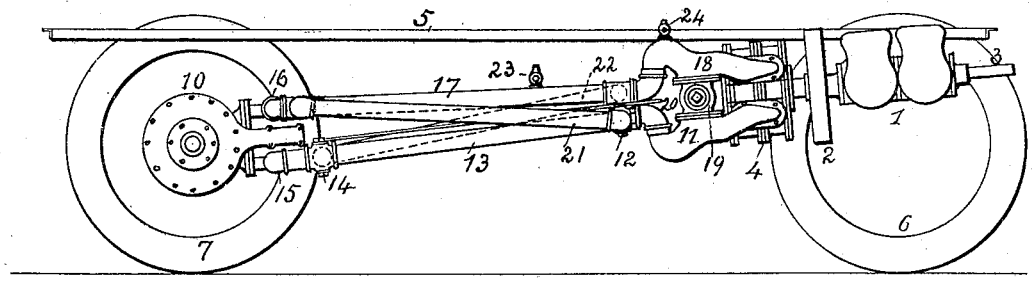
Fig. 2.
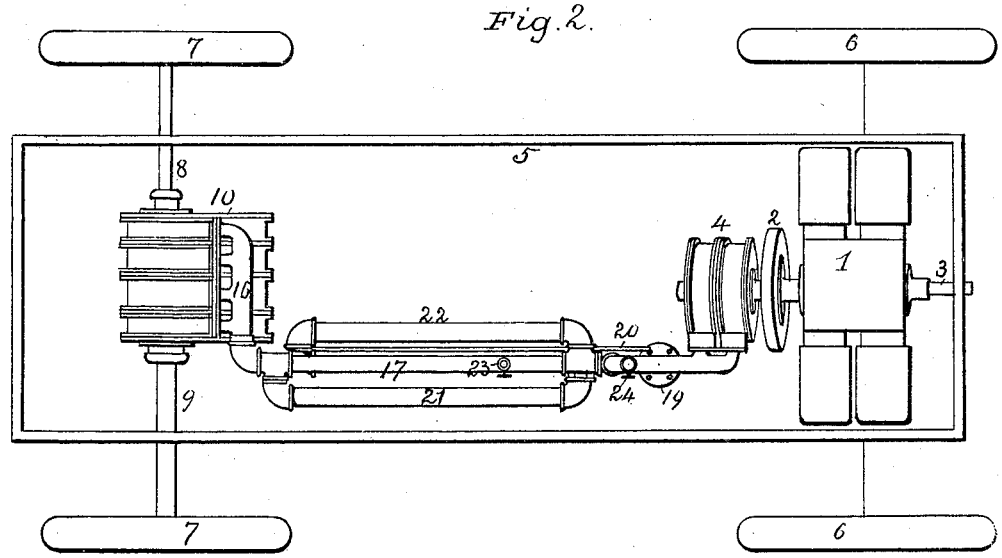
Fig. 20.
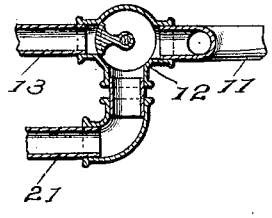
Fig. 3.
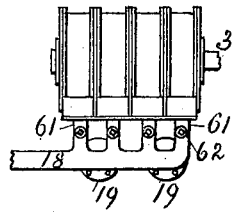
Fig. 3ª.
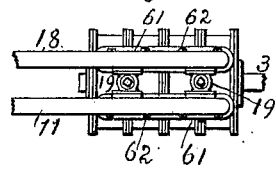
WITNESSES:
N. H. Masson
Louis D. Heinrichs
INVENTOR
Hosmer Tuttle
BY E. E. Masson
Attorney No. 806,759. PATENTED DEC. 5, 1905.
H. TUTTLE.
FLUID POWER TRANSMITTER.
APPLICATION FILED JUNE 13, 1903.

4 SHEETS—SHEET 2.

WITNESSES:
H. H. Masson
Louis D. Hinrichs

INVENTOR
Hosmer Tuttle
BY E. E. Masson
Attorney

No. 806,759. PATENTED DEC. 5, 1905.
H. TUTTLE.
FLUID POWER TRANSMITTER.
APPLICATION FILED JUNE 13, 1903.
4 SHEETS—SHEET 3.
Fig. 6.
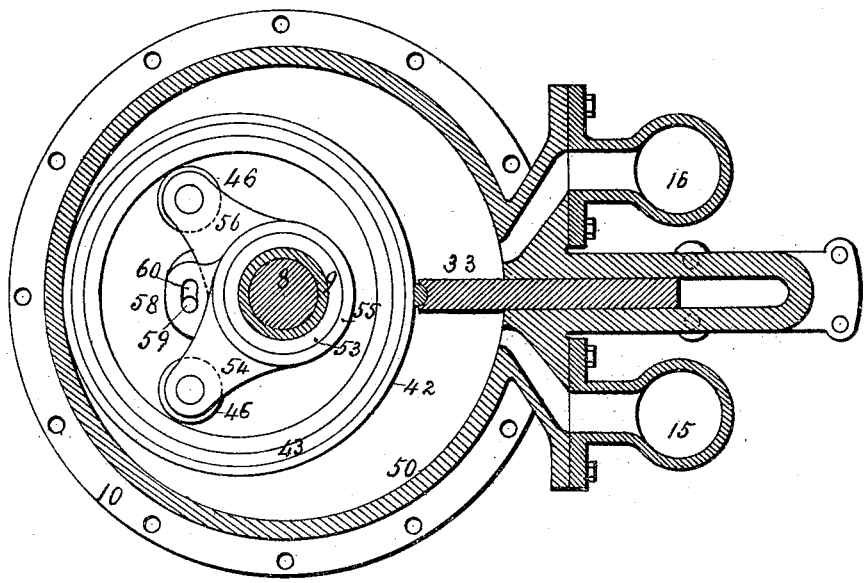
Fig. 7.
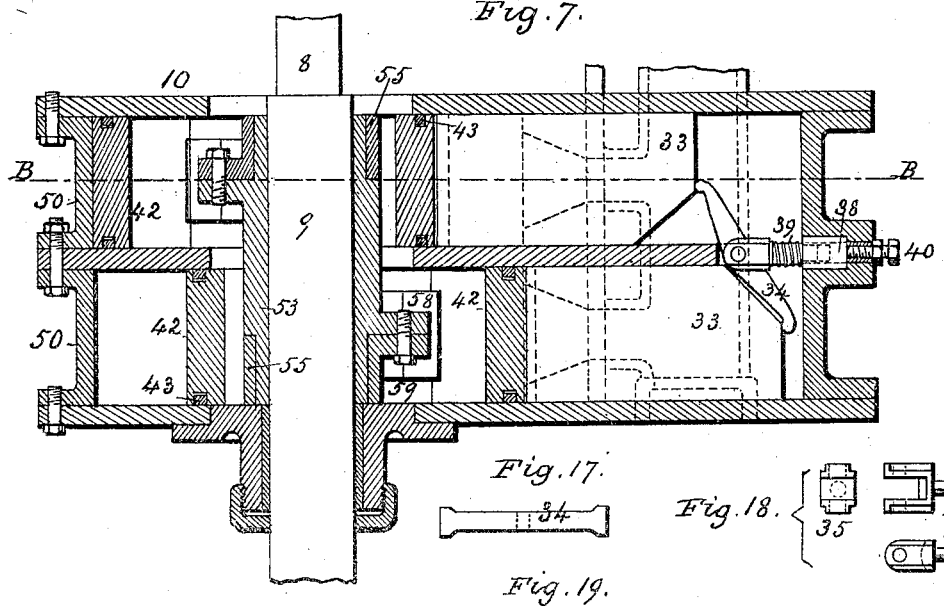
Fig. 17.
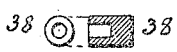
Fig. 18.
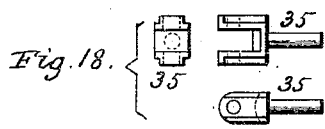
Fig. 19.
WITNESSES:
H. H. Masson
Louis D. Heinrichs
INVENTOR
Hosmer Tuttle
BY E. E. Masson
Attorney.

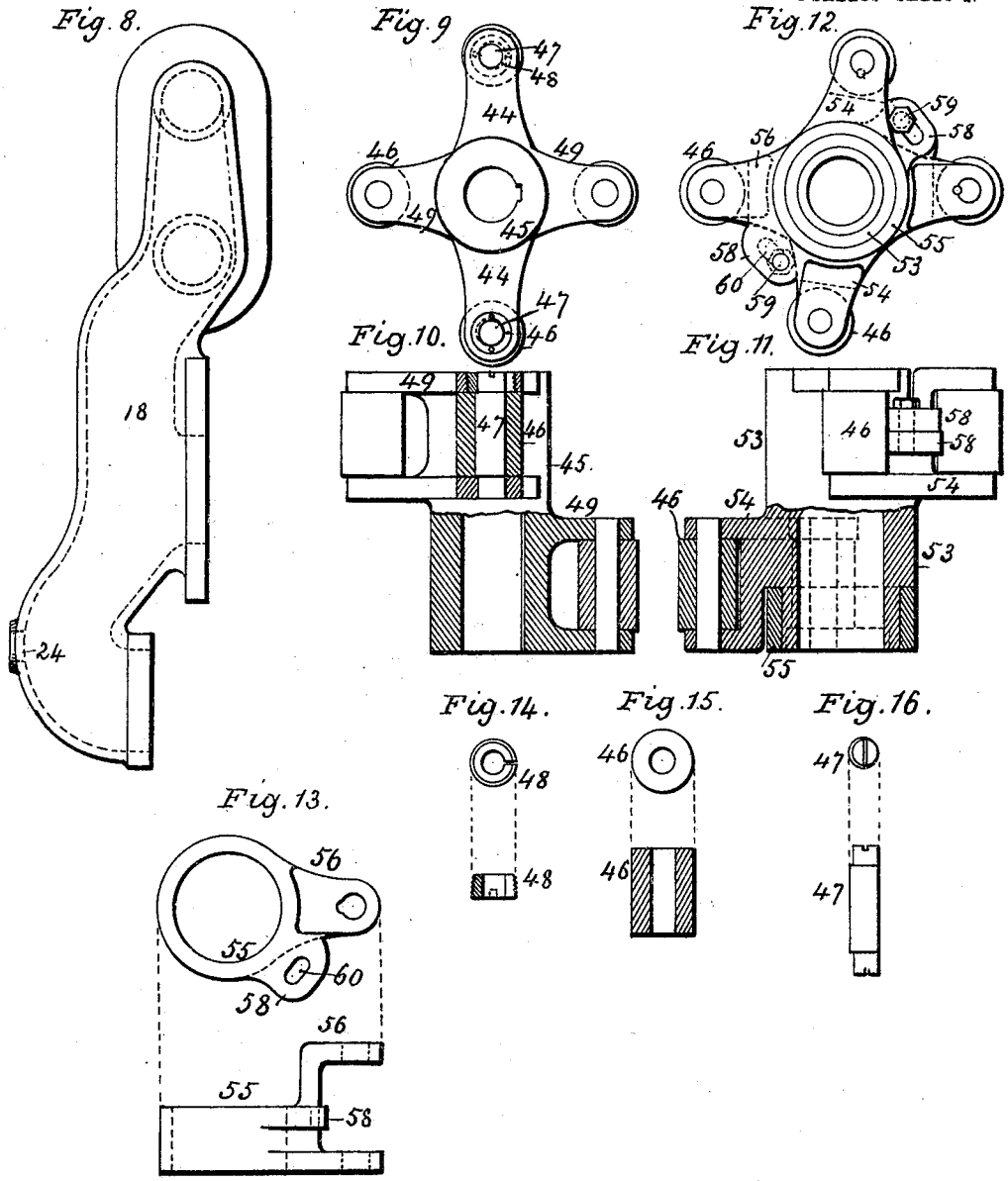

UNITED STATES PATENT OFFICE.

HOSMER TUTTLE, OF CEDAR RAPIDS, IOWA, ASSIGNOR OF ONE-HALF TO JAMES DWIGHT LAMB, OF CLINTON, IOWA.

FLUID-POWER TRANSMITTER.

No. 806,759.   Specification of Letters Patent.   Patented Dec. 5, 1905.

Application filed June 13, 1903. Serial No. 161,330.

*To all whom it may concern:*

Be it known that I, HOSMER TUTTLE, a citizen of the United States, residing at Cedar Rapids, in the county of Linn and State of Iowa, have invented certain new and useful Improvements in Fluid-Power Transmitters, of which the following is a specification.

This invention is particularly well adapted for use on automobile vehicles to dispense with gears and friction-clutches in the transmission of power and also to dispense with differential or compensating gears on the rear or driving axle and is suitable for all kinds of axles made either in one or in two pieces or with a sleeve.

This invention is adapted to variable speeds by the fluid passing through by-pass pipes or by adding to the number of driving-motors in use which are mounted upon the shaft of the prime motor. Said driving-motors are adapted to be regulated by turning an ordinary stop-cock. They are connected by pipes with the driven motor mounted and keyed on the rear axle, said axle being shown divided, two motors being used to facilitate the turning of a curve by the vehicle, although dispensing with differential gears.

The invention will first be described in connection with the drawings, in which—

Figure 4:
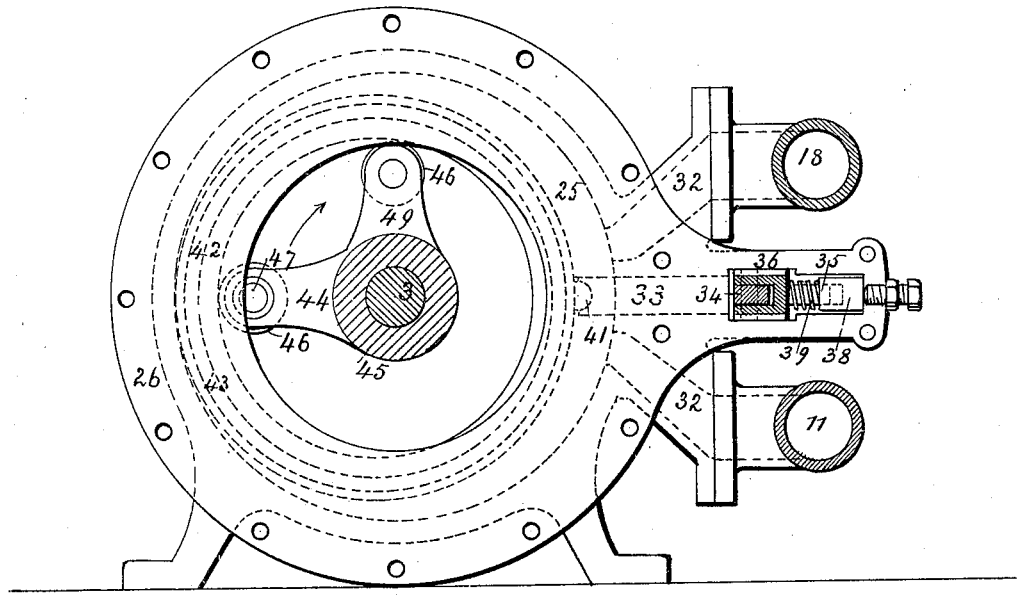
Figure 5:
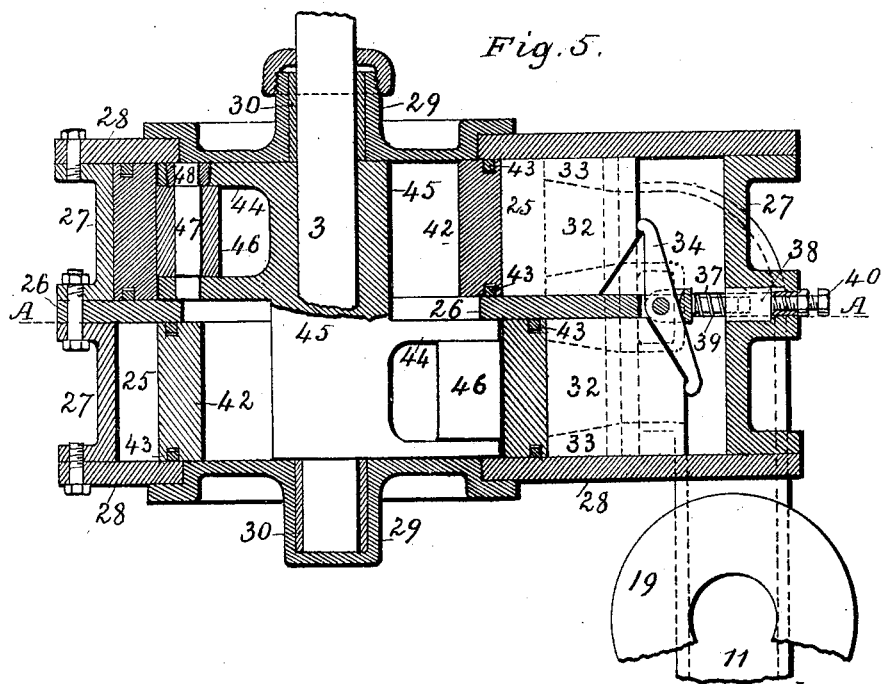

Figure 1 is a side view of the power-transmitter constructed in accordance with my invention. It is shown mounted upon a diagrammatical frame of an automobile vehicle. Fig. 2 is a plan view of the same. Fig. 3 is a plan view of the driving-motor duplicated for use when long ranges of speed are desired, wherein each pipe is controlled by a hand-cock and its interior adapted to be disconnected from the others when the by-pass is open. Fig. 3ª is a side view of the driving-motor shown in Fig. 3. Fig. 4 is a vertical section of one-half of one of the driving-motors, taken on line A A of Fig. 5 in front of and alongside of the central plate separating the two chambers of the motor. Fig. 5 is a horizontal section of one of the driving-motors. Fig. 6 is a vertical section of one-half of one of the driven motors, taken on line B B of Fig. 7, the ring and operated arms being shown in front view. Fig. 7 is a horizontal central section of the driven motor, said driven motor being used in this automobile to rotate its rear axle. Fig. 8 is a side view of a hollow casting to connect two of the ports of one of the driving-motors together and also the flange to secure the by-path of said motor and also the opening to form a connection with one of the pipes leading to the driven motor, two of said castings (right and left) being used for a single driving-motor, as shown in Figs. 1 and 2. Fig. 9 is a side view of a pair of roller-provided arms for the two chambers of the driving-motor and to be keyed upon the shaft of said motor. Fig. 10 is a section of the pair of roller-provided arms shown in Fig. 9, said arms and rollers thereon being used to operate the rotary ring-pistons of the motor. Fig. 11 is a side view, partly in section, of a pair of roller-provided arms for two of the chambers of the driven motor, said arms being intended to be keyed upon either half of the rear axle of the automobile, the hub of each arm carrying another roller-provided arm capable of lateral adjustment relatively to the main arm, said main arm doing the whole propelling while the automobile is going forward. Fig. 12 is a side view of the double pair of arms and rollers of Fig. 11. Fig. 13 is a side view and top view of the hub and one of the arms of the part of the driven motor shown in Fig. 12. Fig. 14 is a top view and section of the split bushing used to clamp the eccentric journal-pin of two of the rollers of the driving-motor. Fig. 15 is a top view and section of one of said rollers. Fig. 16 is a top view and side view of one of the eccentric journal-pins. Fig. 17 is a top view of one of the walking-beams. Fig. 18 is an end view, side view, and front view of the spindle used to carry the walking-beam. Fig. 19 is an end view and longitudinal section of the cup to receive the spindle carrying the walking-beam. Fig. 20 is a horizontal section of one of the three-way cocks and pipes controlled thereby.

This power-transmitter uses a fluid to transmit the power from the driving-motor to the driven motor. Any suitable fluid can be used, but preferably such as lubricating-oil, glycerin, and kerosene-oil. Said fluid is forced from the two or more chambers of the driving-motor into the four chambers of the driven motor and back into the driving-motor through suitably-arranged pipes. The driving-motor and the driven motor are approximately similar in this that they have one or two pairs of cylindrical chambers, each chamber provided with a sliding abutment and a walking-beam to alternately operate said abutment and a rotary piston in the form of a ring adapted to roll eccentrically against the internal periphery of the chamber containing it; but in the driving-motor said ring is rotated under the impulse of roller-provided arms mounted upon the driving-shaft, while in the driven motor the ring-piston therein is rotated by the fluid pressing against its periphery, and said rings rotate roller-provided arms mounted upon the central shaft, which in this case is the rear axle of the vehicle. If the speeds of the driving-motor and of the driven motor were to be equal, the diameter of the chambers of the driving and driven motors being equal the ring-piston would be made of the same diameter in both the driving and the driven motors; but as the shaft of the driving-motor is generally made to rotate the fastest to gain power the ring-piston of the driving-motor is made of greater diameter than the ring-piston of the driven motor to reduce the space between said piston and the cylinder, and consequently reduce the amount of fluid operated upon in the revolution of the driving-motor, four revolutions of said driving-motor being generally made to one revolution of the driven motor. There is very little friction in this mechanism, as the circular piston-ring rolls against the circular casing, and the amount of travel of the ring against the abutment for one revolution of said ring is only about one-tenth of the periphery of the ring for the driving-motor and about one-fifth for the driven motor. In other words, the amount of travel against the abutment is equal to the difference between the periphery of the ring and the internal periphery of the casing. There is also no leaking between the ring and the casing, because said ring is constantly held against said casing by the pressure of the fluid acting on the opposite side of its periphery. Each compartment or casing has two ports—an intake and an exhaust port—and two compartments and rings therein are used to complete a smooth rotation and steady flow of the fluid.

In the drawings the numeral 1 shows the prime motor of an automobile, which motor in this case is a four-cycle four-cylinder gasolene-engine provided with the usual fly-wheel 2 upon its central shaft 3, said shaft partly passing through the casing of the driving-motor 4, said casing being adapted to be suitably secured to the frame 5 of the automobile. Said frame is carried by the axle and front wheels 6 and by the axle and rear wheels 7 of the vehicle. One of said wheels is mounted upon a solid axle 8 and the other upon a tubular axle 9, receiving one end of the axle 8. The driven motor 10, having four compartments, is mounted upon the rear axle, two compartments being mounted upon each of the two portions of the axle. The driving-motor 4 and the driven motor 10 are united together mainly by two pipes—an upper horizontal pipe and a lower horizontal pipe—and a series of intermediate pipes to conduct the fluid for advancing or for reversing motion. With the driving-motor 4 (shown in Figs. 1 and 2) the driving fluid forced out of both compartments of said motor passes through the lower hollow casting or pipe 11 to advance the vehicle, through the three-way cock 12, through the connecting-pipe 13, through the three-way cock 14, through the lower transverse horizontal pipe or casting 15 into the four chambers of the driven motor 10, through their lower ports and around the interior of each chamber, thereby driving around the ring-pistons therein and the roller-provided arms within said rings and the rear axle, to which said arms are keyed. The fluid then issues through ports of the four chambers into the upper transverse horizontal pipe or casting 16, through the connecting-pipe 17, into and through the upper hollow casting or pipe 18, into the ports and interior of the two chambers of the driving-motor 4.

The two pipes or hollow castings 11 and 18 of the driving-motor are united together by an ordinary stop-cock 19 to constitute a bypass to connect the interior of said castings 11 and 18, so that the power of the fluid will be either reduced or ineffective to operate the driven motor 10, according to the amount of opening left in the cock. The by-pass can then be used to relieve either the driving-motor or the driven motor or both of them, thereby permitting the rear axle to revolve, for example, while coasting down hill.

The plugs of the three-way cocks 12 and 14 are connected together by a rod 20, the front end of which is intended to be within reach of the chauffeur. Said three-way cocks are to change the directions of the current of the fluid when desired to reverse the motion of the driven motor, in which case the fluid passes through crossed side pipe 21 to the driven motor 10 and back through the crossed side pipe 22 to the driving-motor 4.

The two motors 4 and 10 and the pipes connecting them are filled with the operating fluid by means of a small pipe 23, standing upon the pipe 17 and provided with a stop-cock. Said pipe 23 can receive a funnel for the admission of the fluid or one end of a pump to force in said fluid, the air within the apparatus being allowed to escape through an opening 24 in the highest point of the casting 18, which opening is generally closed with a small cock.

The driving-motor 4 (shown on a small scale in Figs. 1 and 2 and on a large scale in Figs. 4 and 5) consists of a pair of internally-cylindrical chambers 25, separated by a plate 26, which plate has a large opening in the center for the passage of the ring-driving arms in assembling the machine. To constitute the two chambers 25, there are two annular casings 27, provided with flanges around their peripheries, to which are bolted the two head-plates 28 of the motor. Each head-plate is provided with a central opening, which is closed with a cap 29, which is suitably bolted to each head-plate. The caps 29 are provided with bushings 30, which constitute bearings for the main shaft 3 of the prime motor and of the driving-motor. In the casing of each chamber, on one side thereof, there are two ports 32, one of them leading to the pipe 11 and the other to the pipe 18, and between said ports each casing contains a sliding abutment 33, and each abutment is operated alternately relatively to the other, but positively, by a walking-beam 34. Said beam is pivotally mounted on the enlarged end of a spindle 35. (Shown in detail in Fig. 18.) Said enlarged end is guided and steadied on its four sides by the edges and bottom of corresponding grooves 36 and 37 in the casings. The small end of the spindle 35 is received in a cup 38, retained between the two casings. Around the spindle 35, between its enlarged portion and the edge of the cup 38, there is a spring 39 to obtain a slightly-yielding pressure between the abutments 33 and the operating-rings within the casings. The tension of the spring 39 is regulated by means of an adjustable bolt 40, the inner end of which bears against the solid end of the slidable cup 38. The inner end of each abutment has a concavity to receive a slightly-oscillating shoe 41. The ends of the walking-beam 34 are slightly wider than its body, so that said ends are of the same width as the thickness of the abutments and bear evenly thereon. Within said casing is placed a ring 42, having two flat edges of uniform width and cylindrical outer and inner surfaces. The outer surface is of less diameter than the interior diameter of the casing, to make room between them for the fluid operated upon by said ring in rolling around the casing. To prevent any passage of the fluid inwardly from the outer to the inner portion of each ring, the edge of said ring is provided with a cylindrical groove in which is placed a metal packing-ring 43, supported by flat springs in the bottom of the groove. Each ring 42 is carried around the inner periphery of the casing by means of a roller-provided arm 44, having its hub 45 keyed upon the driving-shaft 3. The length of said arm from the center of its hub to the periphery of the roller 46 is equal to the internal radius of the casing, minus the thickness of the ring, to keep a small portion of said ring constantly in contact with the casing, and to retain said length against wear the journal-pin 47 of the roller 46 is made slightly eccentric relatively to the bearing ends in the arms 44, said ends being clamped to the arms by means of a screw-threaded but split and tapering bushing 48. Upon the hub 45 there is also besides the arm 44 and substantially at an angle of ninety degrees to said arm a roller-provided arm 49 of shorter length, the roller of which does not bear with force against the ring 42, but is used only to steady the rotation of said ring. The hub 45 extends as a continuous body into the two chambers of the motor, the portion in each chamber having two arms, as above described; but the driving-arm 44 in one chamber is at an angle of one hundred and eighty degrees, or opposite the arm in the other chamber, to make a continuous flow of the fluid in the motor.

The construction of the four fluid-chambers of the driven motor 10 is approximately similar to that of the driving-motor 4 in regard to their casing, the ports for the admission and exit of the fluid, the abutments and their operating means; but each ring within the casing is rolled against said casing by the fluid pressing against its periphery on one side of its abutment, and the ring rotates the roller-provided arms therein, the hub of said arms being keyed to the shaft intended to be rotated. The casing of each chamber of the driven motor is indicated by numeral 50, each chamber having a sliding abutment 33 extended therein and an internal ring 42, similar to the ring shown and described for the driving-motor, but of smaller diameter, to permit a larger amount of fluid between said ring and its casing, said fluid being the driving medium. Through the driven motor passes the rear shaft or axle 8, and through two of the chambers passes the hollow axle or sleeve 9 to drive one of the rear supporting-wheels of the vehicle, as shown in Figs. 6 and 7. Upon said axle is keyed or otherwise secured a hub 53, which has in each one of two chambers an arm 54, integral with said hub. The outer end of said arm is forked and has mounted in said fork a roller 46. Each outer end of the hub 53 is reduced in diameter and has mounted loosely thereon a secondary hub 55, carrying an arm 56, having a roller 46. To permit the arms 54 and 56 to be slightly spread apart for the adjustment of the rollers 46 on each arm against the interior of the ring 42 and to allow for the wear of said rollers, each arm 54 and 56 is provided with a radial arm 58, which arms 58 are clamped together with a bolt 59, secured to one arm and passing through a slot 60 in the other. The arms 54 and 56 being at an angle of about ninety degrees to each other, their rollers are easily adjusted to press against the interior of the ring 42 and said ring to press against the interior of the casing.

In the modified form of driving-motor shown in Figs. 3 and 3ª four casing-rings and chambers are used to contain four rings and arms, as shown in Figs. 4 and 5, to be used when long ranges of speed are desired. Each pipe 61, leading from each casing-ring, is controlled by a cock 62 to regulate the admission of the fluid or its amount into the leading pipe 11 or into the return-pipe 18, and each pair of the upper pipes 61 is connected with the corresponding pair of lower pipes 61 by means of the stop-cocks 19, the latter constituting by-passes between the pipes 11 and 18, so that either one only or both driving-motors can be used at the same time.

This transmitter can be used with electric and steam engine prime motors, as well as with gasolene prime motors; but with the former the three-way cocks and the by-paths can be dispensed with, with either kind of prime motors the fluid-transmitter permitting compensating-gears to be dispensed with on the rear axle. This transmitter can also be used upon vehicles having a stationary axle and rotating wheels by attaching a transmitter to the hub of each wheel.

Having now fully described my invention, I claim—

1. In a fluid-power transmitter, a cylindrical casing having two ports, an abutment guided by said casing between the ports, a shaft passing through both heads of the casing, an arm mounted upon said shaft, and a cylindrical ring loose in said casing and rotated by said arm to roll freely upon said casing, the diameter of said ring being less than the internal diameter of the casing.

2. A power-transmitter comprising a cylindrical casing having two ports, an abutment between the ports, a shaft passing through the heads of the casing, an arm mounted upon said shaft, and a roller on the end of said arm, with a cylindrical ring free of attachment with the casing and rotated by said arm and roller pressing it against the casing.

3. A power-transmitter comprising a cylindrical casing having two ports, an abutment between said ports, a shaft passing through the heads of the casing, an arm mounted upon said shaft and having a roller on the end thereof, and a second arm also mounted upon the shaft, with a cylindrical ring free of attachment to the casing and rotated and guided by said arms against the casing.

4. The combination of a cylindrical casing having ports, an abutment between said ports, a shaft passing through the heads of the casing, an arm mounted upon said shaft and a roller on the end thereof with a cylindrical ring unattached to the abutment, and packing-rings in the edges of the cylindrical ring.

5. The combination of two cylindrical casings, each one having two ports, an abutment between each pair of ports and in each casing, a ring unattached to the abutment, a shaft passing through the heads of the casings, a hub mounted upon said shaft, two roller-carrying arms projecting on opposite sides from said hub, each arm being within a separate casing, and a cylindrical ring also within such casing and inclosing said roller-carrying arms.

6. The combination of two cylindrical casings, two cylindrical rings and two roller-carrying arms therein, said rings being adapted to be rolled within said casings, a sliding abutment in each casing, and a walking-beam lever within the walls of the casings and adapted to bear alternately upon each abutment with a spring-supported spindle 35 and its pivot-pin.

7. The combination of two cylindrical casings having lateral projections, two cylindrical rings adapted to be rolled within said casings, a sliding abutment within said casing, a walking-beam lever within the walls of the casings and pivoted upon the enlarged end of a spindle, an adjustable cup receiving the end of said spindle, and around said spindle a spring having one end pressing against the enlarged end of the spindle and the other end against the edge of the adjustable cup.

8. The combination of a cylindrical casing, having two ports, an abutment between said ports, a cylindrical ring within said casing, a shaft passing through the heads of the casing and through said ring, a hub mounted upon said shaft and within the ring, an arm projecting radially from said hub, a roller carried by said arm, its eccentric journal-pin, and split bushings clamping the ends of said pin to the arm of the hub.

9. The combination of a cylindrical casing having two ports, an abutment between said ports, a ring within said casing, a shaft passing through the heads of the casing and through said ring, a hub secured upon said shaft, an arm projecting radially from said hub, a secondary arm provided with a hub mounted upon the first hub, and means to adjust said arms relatively to each other substantially as described.

10. The combination of two cylindrical casings, a ring within each casing, a shaft passing through the heads of both casings, a hub secured upon said shaft and extended in each casing, two arms projecting radially from said hub, and two secondary arms provided with hubs, each one mounted upon one end of the first hub.

11. The combination of a casing having ports, an abutment, a ring intermediate between said casing and the abutment and unattached to said abutment, and a shaft passing through the heads of the casing and through the ring, said shaft having arms to roll the ring around the casing, whereby fluid is advanced between the ring and casing substantially as described.

12. The combination of a casing having ports an abutment, a ring intermediate of said casing and abutment and free of attachment to said abutment, a shaft passing through the heads of the casing and through the ring, said shaft having arms bearing against the interior of the ring, whereby fluid forced into the casing on one side of the abutment rolls the ring, and the latter rotates the arms and the shaft carrying them, substantially as described.

13. The combination of a prime motor, and its axle, and upon said axle a fluid-driving motor having two casings, and unattached rings adapted to roll within said casing, each casing having two ports, an upper and lower hollow casting from each pair of ports, and a stop-cock between said hollow castings whereby a by-pass is provided between them substantially as described.

14. The combination of a fluid-driving motor having two casings, and unattached rings adapted to roll within said casings, each casing having two ports, an upper hollow casting as 18 and a lower hollow casting or pipe from each pair of ports, a fluid-driven motor adapted to be mounted upon the rear axle of a vehicle, a pipe leading from the driving-motor to the driven motor, and a pipe leading from the driven motor to the driving-motor, one of each pipes being provided with three-way cocks substantially as described.

15. The combination of a fluid-driving motor having two casings and unattached rings adapted to roll within said casings, each casing having two ports, an upper and a lower hollow casting or pipe from each pair of ports, a fluid-driven motor, a pipe leading from the driving-motor to the driven motor, a pipe leading from the driven motor to the driving-motor, one of said pipes being provided with three-way cocks and pipes leading diagonally from said cocks to operate as by-passes of the fluid substantially as described.

In testimony whereof I affix my signature in presence of two witnesses.

HOSMER TUTTLE.

Witnesses:
   E. E. MASSON,
   LOUIS D. HEINRICHS.